March 17, 1970  J. P. TANGUAY  3,500,882
MOBILE TREE SLASHER
Filed Jan. 18, 1968  5 Sheets-Sheet 1

INVENTOR
Jean Paul TANGUAY

ATTORNEY

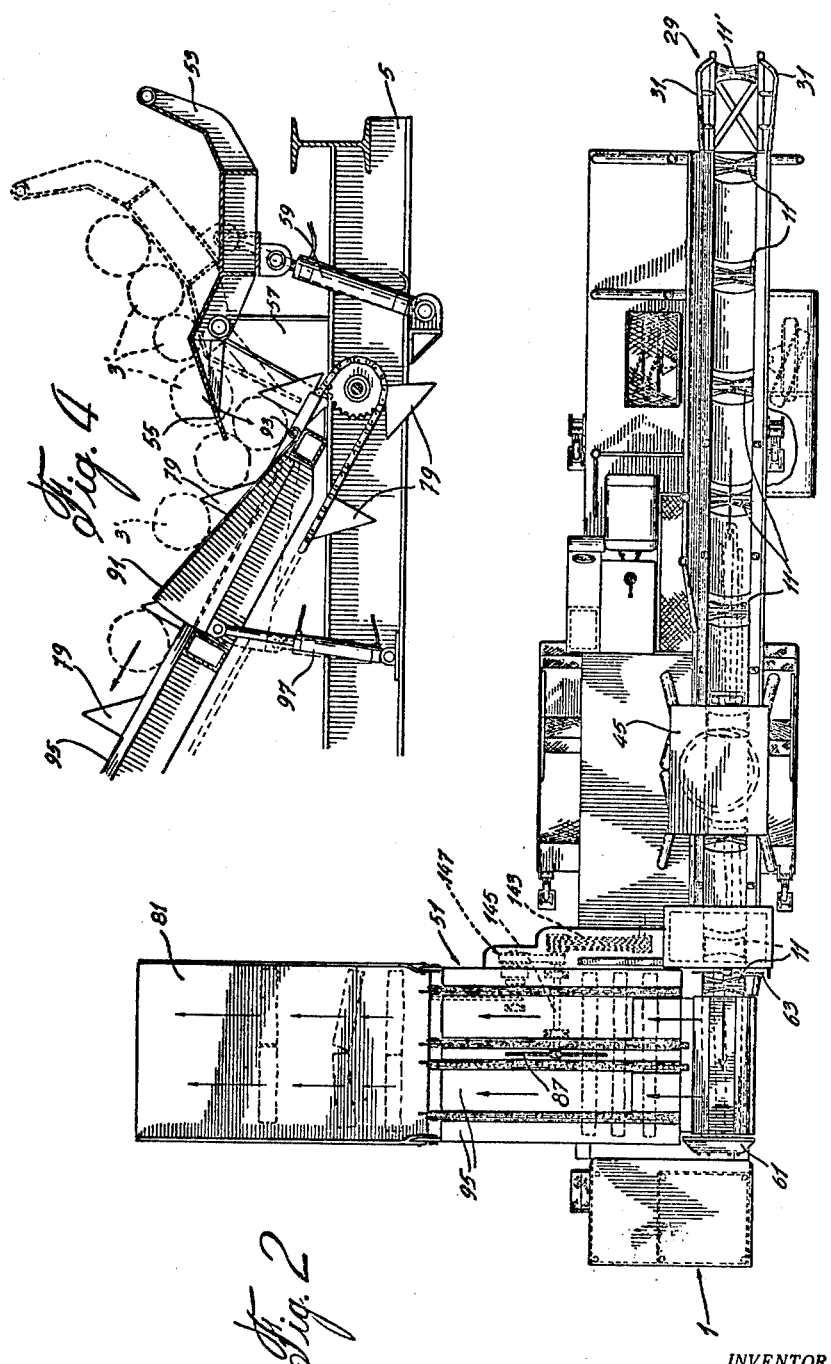

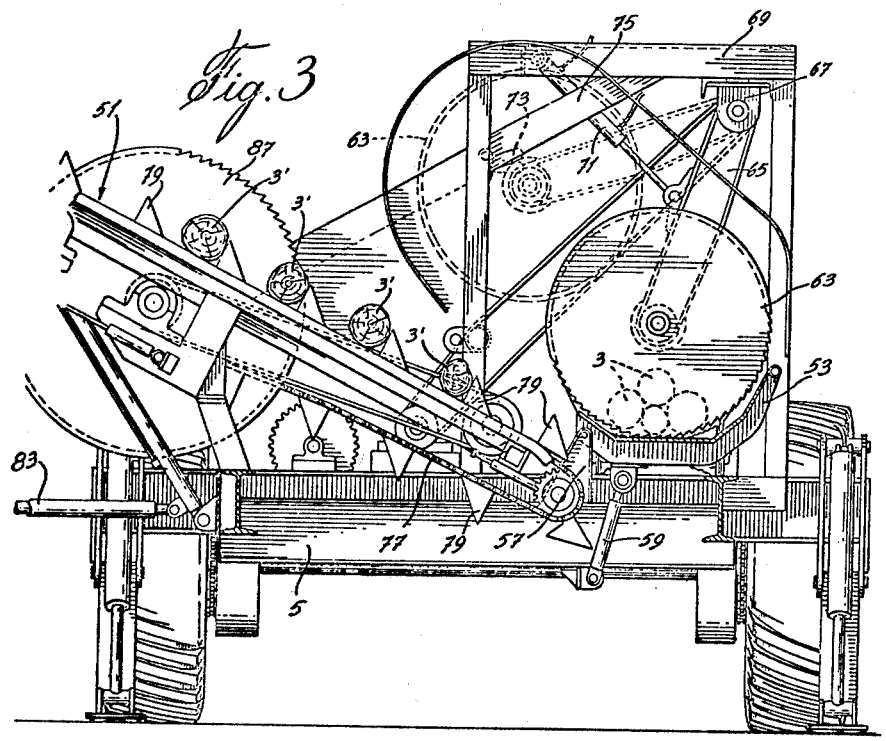
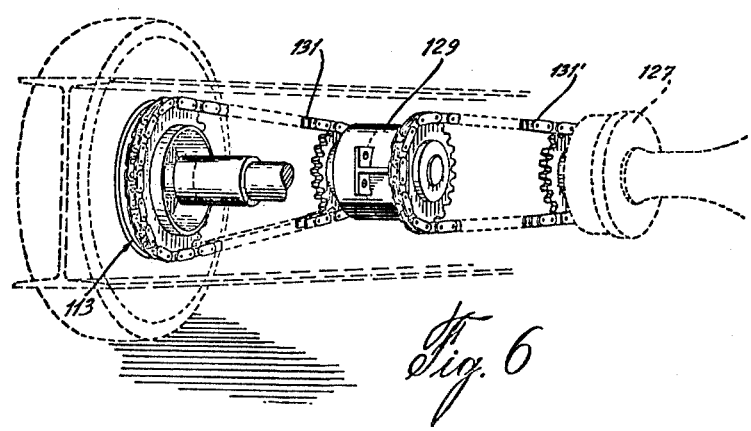

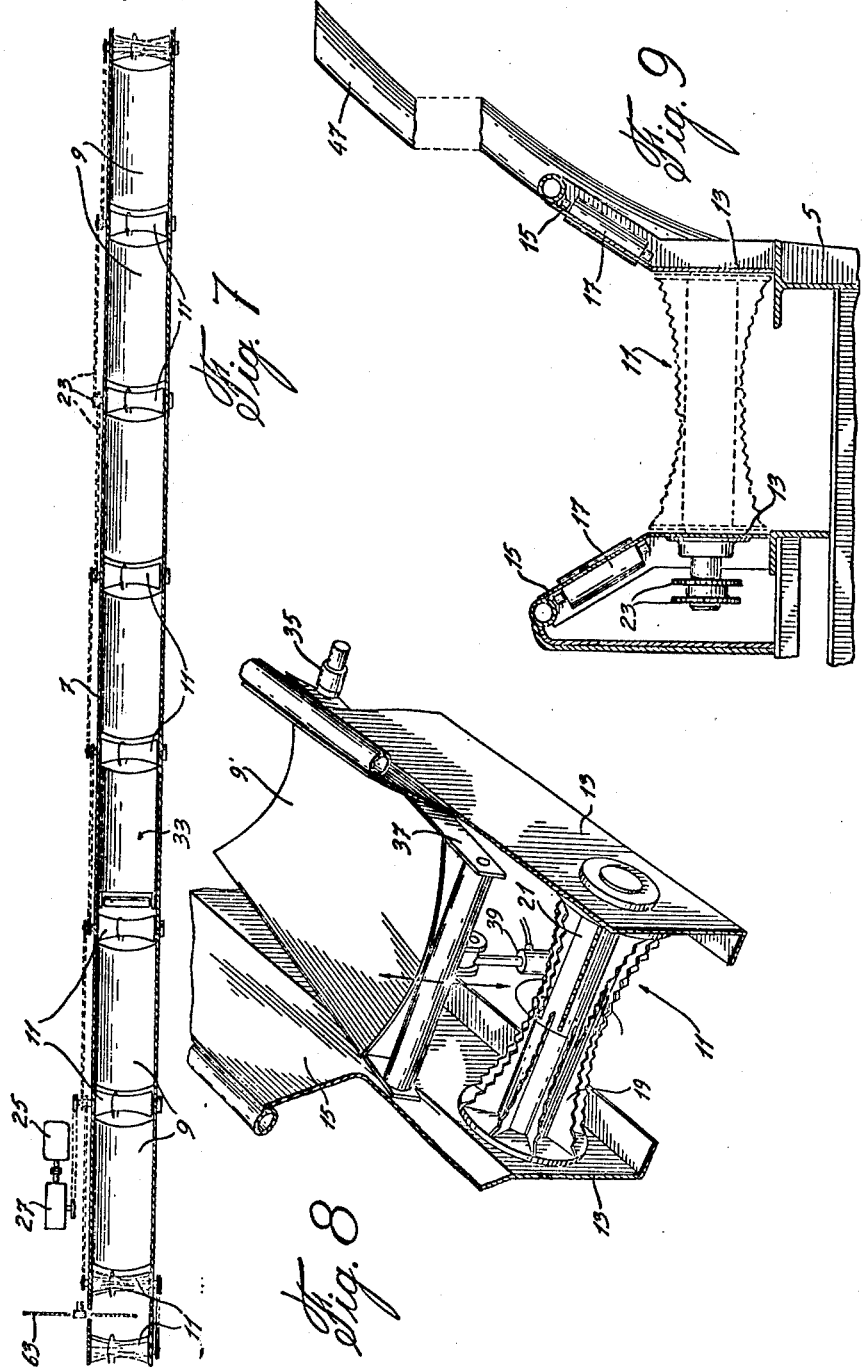

3,500,882
MOBILE TREE SLASHER

Jean Paul Tanguay, Roberval, Quebec, Canada, assignor, by mesne assignments, to Placements Jean Paul Tanguay Ltee, St. Prime, Quebec, Canada, a corporation of Canada
Filed Jan. 18, 1968, Ser. No. 698,764
Claims priority, application Canada, Aug. 24, 1967, 998,652
Int. Cl. B27b 7/00
U.S. Cl. 143—46      13 Claims

ABSTRACT OF THE DISCLOSURE

An appartus for cutting tree stems into logs comprising, a horizontal conveyor for transporting the stems, a first rotary saw for cutting the stems into a first set of logs having twice their final length, an upwardly sloping conveyor for lifting the said first set of logs, a second rotary saw for cutting in half the first logs while the latter are raised.

BACKGROUND OF THE INVENTION

Field of the invention

The present invention relates to a movable slasher for cutting tree stems and is of the type which is used at the site of the tree cutting operations.

Slashers of this general type are known and the present invention proposes to overcome numerous deficiencies of the present slashes and generally improve the efficiency thereof.

Description of the prior art

As is known, this type of slasher has an elongated receiving conveyor over which the tree stems are laid and directed toward one end of the slasher for the first cutting operation where the stems are cut into logs of predetermined length. The logs then rest on a transfer table which carries them onto a second conveyor extending laterally of the first one and either loading a truck or discharging them on a pile.

Summary of the invention

A first object of the invention is to provide devices on the first and second conveyors to vibrate the tree stems or logs in order to properly align them on the respective conveyors. The first conveyor is also provided with gripping rollers that can rotate in either direction so that the tree stems are properly aligned on the transfer table prior to their cutting into logs. The transfer table itself is of a novel type which more efficiently and easily carries the logs onto the lateral conveyor.

The latter conveyor is provided with a central saw to cut the logs received from the transfer table into two thus ensuring a more efficient and rapid operation.

In order to prevent piling up of logs, particularly on the second conveyor, the two saws as well as the second conveyor are mounted to be driven in unison.

Another object of the invention lies in the provision that, for safety purposes, the first conveyor will not operate unless the first saw is in inoperative position. The latter is swingable in a vertical plane from an upper operative to a lower inoperative position.

A further object of the invention resides in that the lateral conveyor is detachably mounted on the base of the slasher and posts are provided above the first conveyor for resting the said second conveyor thereon. In this manner, it is possible to build the slasher within the narrow limits as to width whereby it can be driven on conventional roads.

A still further object of the invention resides in the provision of jacks mounted alongside the base of the slasher and usable to lift either of the forward or rearward ends of the slasher or both or to be used to stabilize the slasher in operation.

BRIEF DESCRIPTION OF THE DRAWING

Other objects and further features of the invention will be indicated or will become apparent from the following description of a preferred embodiment of the invention having reference to the appended drawing wherein:

FIG. 2 is a plan view of the slasher of FIGURE 1;

FIG. 3 is a partial rear elevation view of the slasher, the operating cab being removed;

FIG. 4 is a partial cross-sectional view in elevation taken in a vertical plane extending across the centerline of the second conveyor;

FIG. 6 is a perspective view of the gear end sprocket mechanism for driving the rear wheels;

FIG. 7 is a longitudinal cross-sectional view of the first conveyor;

FIG. 8 is a perspective view of a kicking device on the first conveyor;

FIG. 9 is a vertical cross-sectional view of the first conveyor, adjacent the forward end of the base.

DESCRIPTION OF THE PREFERRED EMBODIMENTS

Figure 1:
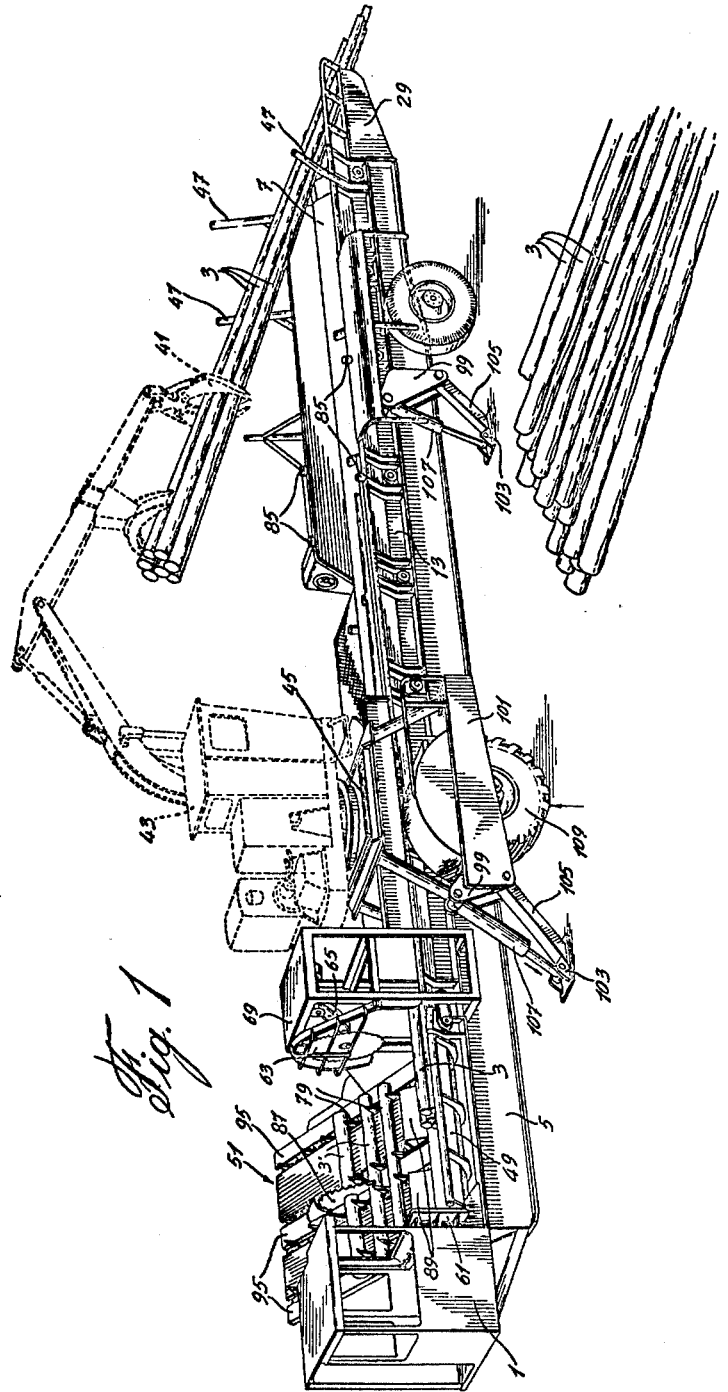
FIG. 1 is a lateral perspective view of a movable slasher made according to the invention.

With reference to FIGURE 1, the rearward end of the slasher is to be taken where the cab 1 is mounted, the tree stems 3 being loaded on the forward end.

The slasher comprises an elongated wheeled base 5 over which is mounted a conveyor 7 extending generally longitudinally of the base 5. As best shown in FIGURE 7, the conveyor comprises a series of generally arcuate horizontal bottom plates 9 spaced from one another and between each one of which is mounted a roller 11, each rotatable about a horizontal axis extending transversely of the conveyor. Rollers 11 are mounted for rotation on two side walls 13 (FIGURES 8 and 9) the upper ends of which bend outwardly and are provided with freely rotatable upward rollers 17 to ensure longitudinal displacement of all timber stems lying over the conveyor. All conveyor rollers 11 are of the gripping type, although only the end ones are thus shown in FIGURE 7. Gripping of rollers 11 may be obtained through a series of spaced radial plates 19 having a serrated arcuate outer edge and secured to a central hub 21.

Rollers 11 are driven in series by means of a sprocket and chain arrangement 23 connected to a reversible motor 25 through a speed reducer 27.

Preferably, conveyor 7 has a detachable forward section 29 (FIGURES 1 and 2) for helping the free end of the stems 3 into the conveyor 7. This section slightly differs from the main section of the conveyor in that the lateral walls 31 thereof, here shown as made of tubing, are not only inclined outwardly but are also slightly flared forwardly. The forward end of the guiding section 29 may be provided with a freely rotatable gripping roller 11'.

In order to ensure that stems 3 be properly aligned and parallel with one another in conveyor 7, the invention proposes the provision of a kicking device 33 illustrated in details in FIGURE 8. The latter is formed of an arcuate bottom plate 9' similar to the other bottom plates 9 and fixed to a generally rectangular frame 37. Frame 37 is secured, at the forward end thereof, on an axle 35 pivotally mounted on the conveyor side walls 13 in any known manner. A hydraulic motor or cylinder 19 is operatively mounted between the rearward end of the frame 37 and the base 5. It will be understood that intermittent operation of the hydraulic motor 39 will jerk or vibrate the bottom plate 9' in an upward direction thus slightly lifting the stems 3 to force them into parallel alignment.

As shown in FIGURE 1, the stems 3 are moved onto conveyor 7 by means of the grappel 41 of a loader 43. The latter are shown in dotted lines since this equipment is conventional and does not form part of the invention. It is to be mounted over a pedestal structure 45 which should be constructed to receive any type of conventional loaders. The pedestal 45 may be built over conveyor 7 to rest on the slasher base 5. In view of the fact that stems 3 are normally grabbed at one end thereof, outwardly inclined guiding posts 47 may be provided at the forward end of the conveyor 7 to guide the free end of the stems into conveyor 7.

Rearwardly of conveyor 7 and in alignment therewith is a generally arcuate transfer table 49 intended, in its pivoting movement to discharge logs onto a laterally extending upwardly inclined second conveyor 51 to be described hereinafter. Transfer table 49 is best illustrated in FIGURES 3 and 4. It will be seen to consist of a concave bed 53 terminating, on the lateral conveyor side, into a downwardly inclined apron 55. Bed 53 is pivotally mounted, adjacent apron 55, at the top of brackets 57 secured to the top of slasher base 5. A hydraulic motor or cylinder 59 is operatively connected between the bottom of the bed 53 and that of the base 5, to thereby cause pivoting of the bed 53 when actuated, as shown in dotted lines in FIGURE 4. An abutment wall structure 61 (FIGURES 1 and 2) is provided at the rearward end of the bed 53 for the abutment of the stems 3 as the latter are driven rearwardly by the gripping rollers 11 of the first conveyor 7.

A first saw 63 is mounted to move in a vertical plane generally between the first conveyor 7 and the transfer table 49. Actually, and as best seen in FIGURE 7, the saw is preferably mounted between the two end rollers 11 at the rearward end of the conveyor 7 but for practical purposes, it may be considered that it is mounted between the said conveyor 7 and the transfer table 49.

The first saw 63 is mounted for rotation at one end of an arm 65 of which the other arm is pivotally mounted on a bracket 67 fixed to the top of an upstanding frame 69 built on the slasher base 5. A hydraulic motor or cylinder 71 is operatively connected between the middle of arm 65 and the top of the upstanding frame 69, away from bracket 67. Operation of hydraulic motor 71 will move the saw 63 from an upper inoperative position shown in dotted lines in FIGURE 3 to a lower operative position shown in full lines where saw 63 cuts the stems 3, mounted on the conveyor 7 and the transfer table 49.

A limit switch 73 is secured to a brace 75 of the upstanding frame 69 to be operated by the bearing of the first saw 63 when the latter is in the inoperative position. This limit switch is in the circuit of the reversible motor 25 (FIGURE 7) and the arrangement is such that the rollers 11 can only be operated when the limit switch 73 is closed, that is, when saw 63 is in inoperative position. This is a safety measure to prevent rearward movement of stems 3 when the first saw 63 is in operative position.

The second conveyor 51 is detachably mounted as a unit on the slasher base 5. It is of the saw-tooth type comprising two pairs of chains 77 over which are spacedly mounted right angular teeth 79. It will thus be understood that logs 3' cut from the stems 3 and received from the transfer table 49 will be moved up the incline of the second conveyor 51.

As shown in FIGURE 2, a generally flat apron 81 is preferably provided, being pivoted at one end to the discharge end of the second conveyor 51. Apron 81 is downwardly inclined whereby to load logs into a truck or discharge them on a log pile. Its inclination may be adjusted through a telescoping connector 83 (FIGURE 3) pivotally connected at one end to the slasher base 5 and at the other end to the free end of apron 81. Adjustment of the inclination of this apron 81 is obtained by adjustment of the inner and outer members of the telescoping connector 83. Locking may be by any known means such as by a pin extending through the inner and outer members.

As mentioned previously, the second conveyor 51, and apron 81 as well, can be detached from the base 5 and laid over four short posts 85 (FIGURE 1) projecting from the side walls of the conveyor 7. In this manner, the width of the vehicle may be reduced to within the limits acceptable for driving on conventional roads.

In order to increase the efficiency of the slasher, a second saw 87 (FIGURES 1, 2 and 3) may be provided at the center of the second conveyor 57. Thus, a quicker cutting operation is provided than if only one saw was used.

Similarly to first conveyor 7 and for the same purpose, a pair of kicking devices 89 are provided on the receiving end of the second conveyor 57, adjacent the discharge end of the transfer table 49. As shown in FIGURE 4, each such device comprises a table structure 91 pivotally mounted, as at 93, to longitudinal members 95 (FIGURE 1) of conveyor 51. Vibration of the said kickers 89 is obtained by means of hydraulic motors or cylinders 97 operatively connected between the upper end of the table structures 91 and the slasher base 5.

In order to properly stabilize the slasher during operation and also to raise one end thereof or the complete slasher, triangular jacks such as those shown in FIGURE 1, are provided on either side of frame 5. In the embodiment illustrated, each jack comprises an upstanding arm 99 fast with the base, directly through a mud guard structure 101; a foot plate 103 adapted to sit firmly on the ground; a bar 105 pivoted at the upper end to the lower end of the arm 99 and fixed, at the lower end, to the base plate 103. This triangular structure is closed by a hydraulic motor or cylinder 107 operatively connected between the base 103 and the upper end of arm 99. Thus, a slight extension of the motors 107 will solidly stabilize the slasher while further extension will cause rising thereof by forcing the triangle to close. It will be noted here, as aforesaid, that the arm 99 is made solid with the slasher base 5.

Figure 5:
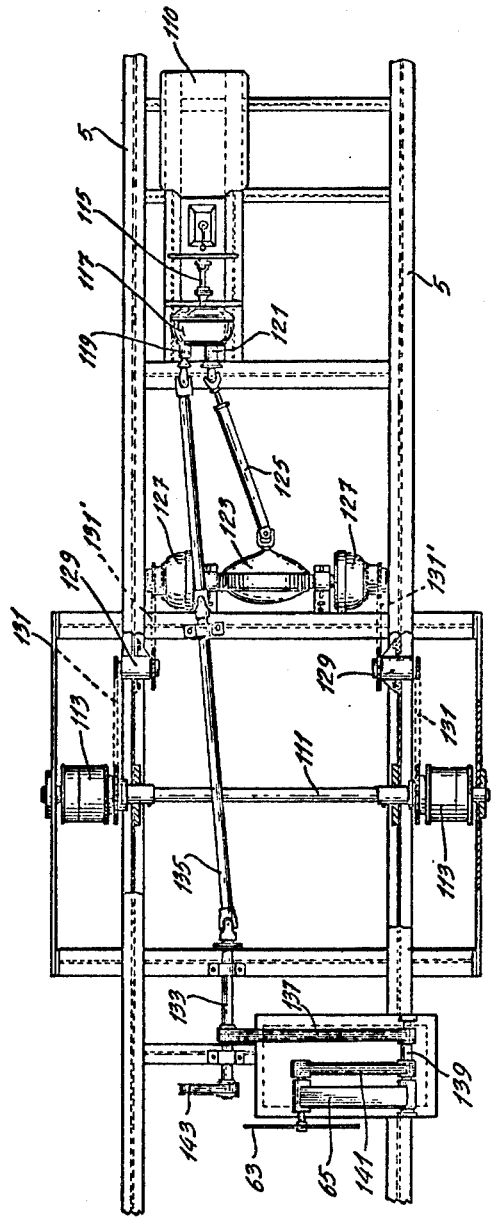
FIG. 5 is a partial plan view of the driving mechanism of the slasher.

Now with reference to FIGURE 5 for a description of the power arrangement to drive the rear wheels 109 (see FIGURE 1), the two saws 63 and 87 and the toothed chains 79 of the second conveyor 51.

As shown, a transverse rear axle 111 is mounted for rotation transversely of base frame 5 and is provided, at each outer end, with a wheel hub 113 over which the rear wheels 109 (FIGURE 1) are mounted.

Power is drawn from an engine 110 secured on base 5 and having a power take-off 115 operatively connected to a transfer case 117 of the conventional type from which extend two power take-offs 119, 121. Power take-off 121 is connected to a differential 123 through a conventional universal connection 125. Differential 123 and the axles extending laterally therefrom are mounted transversely of base 5 which the interposition of conventional braking units 127. A pair of bearing units 129 are mounted on two longitudinal members of base 5 and sprocket chains 131, 131' interconnect the transverse axles of differential 123 to the rear axle 121 of the rear wheels 109.

As mentioned previously, the first saw 63, the second saw 87 and the toothed chains 77 of the second conveyor are preferably driven together, particularly the second saw 87 and the toothed chains 77 of conveyor 51. For this purpose, the second power take-off 119 drives a common shaft 133 through a conventional universal connection 135. From this common shaft 133, a first chain drive 137 causes rotation of an auxiliary shaft 139 mounted on a lateral member of base 5 and to which is connected the sprockets of a second chain drive 141 directly coupled to the driving shaft of the first saw 63.

On the other hand, a third chain drive 143, connected at one end to the common shaft 133 drives an auxiliary shaft 145 (FIGURE 2) on the lateral conveyor 51, the said auxiliary shaft 145 having mounted thereon the second saw 87. Finally, a fourth chain drive, generally denoted by numeral 147, is responsible for the simultaneous travelling of the toothed chains 77 of the said second conveyor 51.

It has been mentioned previously that one feature of the present invention is the provision of a reversible motor 25 (FIGURE 7) for the rotation of the gripping rollers 11. This is advantageous in that when the timbers 10 are moved rearwardly by first conveyor 7 to finally abut the wall 61 (see FIGURE 1) of the transfer table 49, it may happen that some of the lower stems may not have reached the said wall in which case the operator, standing in the operation cab 1, may cause the group of stems 3 to travel slightly forwardly by reversing the rotation of the rollers 11 and again rearwardly to bang them against the abutment will 61 and allow the retarded stems to reach the abutment wall 61. In this manner, the operator will be ensured that all logs resulting from the cutting operation of the first saw 63 will have the same length.

It will be understood that many changes can be made to the aforesaid description within the scope of the invention and that the latter should only be construed from the appended claims.

I claim:

1. A movable slasher for cutting tree stems into logs, comprising, in combination:
   (a) a wheeled elongated base to be displaced over ground; said base having a forward and a rearward end;
   (b) a first conveyor mounted on said base, longitudinally thereon; said first conveyor formed of a series of spaced gripping rollers and reversible motor means to rotate said rollers to cause movement of said stems from said forward to said rearward end and vice versa;
   (c) a kicking device mounted between a pair of successive rollers of said first conveyor and means to jerk said device upwardly above the level of said rollers to cause longitudinal parallel alignment of said tree stems;
   (d) a transfer table mounted on said base at the rear end thereof, level and in alignment with said first conveyor; said table having a wall at the rear end thereof for the abutment of stems moved by said first conveyor;
   (e) a first saw mounted generally between said first conveyor and said table and means to move said first saw from an upper inoperative position to a lower cutting position at the level of said first conveyor and table; said saw to cut tree stems into logs of predetermined length;
   (f) a second conveyor mounted on said base to extend laterally of said transfer table; said conveyor movable from a receiving end, adjacent said transfer table, to a discharging end;
   (g) a second saw mounted centrally of said second conveyor to cut said logs into two generally equal parts;
   (h) means to rock said transfer table to discharge the logs thereon onto the receiving end of said second conveyor;
   (i) means to drive said two saws and said second conveyor in unison, and
   (j) a kicking device on said second conveyor to cause transverse alignment thereon of said logs.

2. A slasher as claimed in claim 1, wherein the kicking device of said first conveyor is a generally arcuate bed mounted on said conveyor to pivot, at one end, about an axis transverse to said conveyor and said jerking means is a hydraulic piston operatively connected to the other end of said arcuate bed and to said base.

3. A slasher as claimed in claim 1, wherein said transfer table is mounted to rock about an axis parallel to the longitudinal axis of said first conveyor and located adjacent said second conveyor; said rocking means in (g) is a hydraulic piston operatively mounted between said base and said table on the side of said rocking axis away from said second conveyor.

4. A slasher as claimed in claim 1, wherein said moving means recited in (e) is an arm mounted for swinging motion about an axis extending parallel to the longitudinal axis of said first conveyor, said first saw being a rotary saw mounted at the other end of said arm, and a hydraulic piston operatively connected to cause swinging of said first saw.

5. A slasher as claimed in claim 1, including means to cause operation of said first conveyor only when said first saw is in its upper inoperative position.

6. A slasher as claimed in claim 1, wherein said second conveyor is mounted to extend angularly upwardly from said receiving end.

7. A slasher as claimed in claim 6, including a guiding apron pivotally connected to the discharge end of said second conveyor and means adjustably connecting the free end of said apron to said base to vary the angle of said apron.

8. A slasher as claimed in claim 1, wherein said kicking device of said second conveyor comprises a pair of spaced plates mounted at said receiving end to pivot about a transverse axis and hydraulic pistons to lift said plates to cause pivoting and jerking thereof for alignment of said logs on said second conveyor.

9. A slasher as claimed in claim 1, wherein said first conveyor comprises a detachable stem guiding forward section having a horizontal bottom and two forwardly flaring inclined side walls intended to direct one end of said stems to be cut toward said bottom.

10. A slasher as claimed in claim 1, wherein said first conveyor has outwardly inclined lateral walls and upstanding freely rotatable rollers partially projecting from said side walls to ease movement of said tree stems on said first conveyor.

11. A slasher as claimed in claim 1, including a forward and a rearward triangular jack on each side of said base; each jack comprising: an upstanding arm fast with said base; a foot plate adapted to sit firmly on the ground; a bar pivoted at one end to the lower end of said arm and fixed at the other end to said base plate, and a hydraulic cylinder pivoted, at the ends, to said base plate and to the upper end of said arm, respectively.

12. A slasher as claimed in claim 1, wherein said second conveyor is detachable from said base and including two spaced posts on each side wall of said first conveyor for the laying thereon of said detachable second conveyor.

13. A slasher as claimed in claim 1, wherein said wheeled base comprises: a rear axle and wheels mounted on said axle; chain drive means for driving said saws and second conveyor in synchronism; an engine; a transfer case and means operatively connecting said transfer case to said engine; chain drive means for driving said wheels; said transfer case having two power take-offs, and connecting rod means joining said take-offs and said chain drive means respectively.

References Cited

UNITED STATES PATENTS

| 2,612,191 | 9/1957 | Patin | 143—46 |
| 2,876,815 | 3/1959 | Rogers | 143—46 |

GERALD A. DOST, Primary Examiner

U.S. Cl. X.R.

144—312